United States Patent [19]
Baird, Jr. et al.

[11] 3,821,182

[45] June 28, 1974

[54] METHOD FOR PREPARING OF FILM OF A VINYLIDENE CHLORIDE POLYMER

[75] Inventors: William G. Baird, Jr., Winchester; Stanley E. Holbrook, South Acton; Jeremy A. Platt, Cambridge, all of Mass.

[73] Assignee: W. R. Grace & Co., Cambridge, Mass.

[22] Filed: Feb. 11, 1971

[21] Appl. No.: 114,692

Related U.S. Application Data

[62] Division of Ser. No. 590,107, June 2, 1966, abandoned, which is a division of Ser. No. 157,194, Dec. 5, 1961, abandoned.

[52] U.S. Cl............... 260/91.7, 117/161, 161/198, 161/199, 161/227, 161/231, 161/254, 204/159.14, 260/78.5 UA, 260/85.5 XA, 260/86.3, 260/87.1, 260/87.7, 264/171
[51] Int. Cl. ........................................... C08f 15/06
[58] Field of Search........................... 260/91.7, 87.7

[56] References Cited
UNITED STATES PATENTS

| | | | |
|---|---|---|---|
| 2,233,442 | 3/1941 | Wiley................... | 260/91.7 |
| 2,309,370 | 1/1943 | Williams.............. | 260/91.7 |
| 2,332,489 | 10/1943 | Reinhardt et al..... | 260/91.7 |
| 2,344,511 | 3/1944 | Harder.................. | 260/91.7 |
| 2,354,435 | 7/1944 | Stedman............... | 260/91.7 |
| 2,405,008 | 7/1946 | Berry.................... | 260/91.7 |

*Primary Examiner*—Harry Wong, Jr.
*Attorney, Agent, or Firm*—John J. Toney; William D. Lee, Jr.

[57] ABSTRACT

A vinylidene chloride polymer film, a method of producing a direct laminate of vinylidene chloride and a non-saran thermoplastic polymer, preferably polyethylene, including procedures for orienting and irradiating the laminate and the method above wherein the outer polymer layers are stripped from the saran to provide a saran film.

5 Claims, 7 Drawing Figures

3,821,182

METHOD FOR PREPARING OF FILM OF A VINYLIDENE CHLORIDE POLYMER

This application is a division of my prior copending application Ser. No. 590,107, filed on June 2, 1966 which was a division of Ser. No. 157,194, filed Dec. 5, 1961, now both abandoned.

This invention relates to novel saran products and methods of making the same.

It is an object of the present invention to prepare an unoriented film of vinylidene chloride polymer having improved physical characteristics.

Another object is to prepare an extruded saran film free from blemishes due to die scratches and/or film handling mechanisms.

A further object is to prepare saran films having high gloss and clarity.

An additional object is to devise a simple and efficient process for preparing extremely thin saran film.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be accomplished by melt extruding a ply of saran with a ply of another extrudable, thermoplastic polymer other than saran. Thereafter, the thermoplastic ply is stripped from the saran ply in the preferred form of the invention. Frequently, it is advantageous to have both sides of the saran ply covered by a ply of a thermoplastic resin other than saran. In such case both of the outer non-saran thermoplastic plies can be stripped from the center saran ply.

The melt extrusion is carried out from a die and the plies are directly joined before leaving the exit of the die. Preferably, the plies are extruded in tubular form with the inner ply being polyethylene or polypropylene (or other polymer having a relatively low adherence to saran) and the outer ply being saran. In an alternative preferred procedure, three tubular plies are formed with the intermediate ply being saran and the inner and outer plies being the same or different non-saran thermoplastic polymers, e.g., both are polyethylene or polypropylene (or one of the inner and outer plies is polyethylene and the other polypropylene).

As an example of the non-saran thermoplastic polymer which can be employed as an outer coat (and inner coat) in extruding the saran there can be used: other solid olefins, e.g., polyethylene, polypropylene, polybutylene; other polymeric hydrocarbons, e.g., polystyrene; cellulose esters, e.g., cellulose acetate, cellulose propionate, cellulose trityrate, cellulose nitrate; polyvinyl acetate; polymethacrylates, e.g., polymethyl methacrylates, polybutyl methacrylate; polyvinyl alcohol; polyvinyl acetals, e.g., polyvinyl trityral; polyallyl alcohol; polyallyl acetate; polyesters, e.g., polyethylene terephthalate (Dacron); polyamides, e.g., nylon.

The term "saran" is used in its normal sense to include normally crystalline polymers, both homopolymers and copolymers containing vinylidene chloride.

As copolymerizable materials there can be used vinyl chloride, acrylonitrile, vinyl acetate, ethyl acrylate, methyl methacrylate. Terpolymers can also be employed, e.g., a terpolymer of vinylidene chloride, dimethyl maleate and vinyl chloride. In general, the vinylidene chloride is at least 50 percent of the material in the polymer.

Different sarans vary in thermal stability, depending upon such factors as the purity of the resin, the composition of the blend in which they are used, and the vinylidene chloride content of the polymer. It will be obvious that variations in the stability of the saran polymer used will, to a considerable extent, control the nature of the non-saran thermoplastic polymers which can be utilized in the present invention.

In the illustrative examples a copolymer of about 75 percent vinylidene chloride and 25 percent vinyl chloride was employed.

When the laminate tubular product is hot blown after leaving the die, it is not oriented substantially, although there is some bilateral stretching (alternatively, extrusion can be carried out without any stretching). The outer and/or inner layer of thermoplastic non-saran polymer can be removed to produce a saran tube or film with improved properties. The thermoplastic polymer layer or layers serve to support the saran and permit the formation of very thin saran films. In addition, there is obtained a saran film having improved characteristics as compared to film produced by conventional hot blown techniques. The saran film produced by the instant invention is free from blemishes due to die scratches or mechanisms conventionally employed for handling extruded saran film. In addition the saran film has greater elongation, better tear resistance, less tack, less shrink when heated and greater clarity when compared with oriented saran made by conventional hot blown techniques from the same blended polymer.

The outer thermoplastic plies can be stripped from the saran at any point after the saran layer is substantially crystalline following extrusion. The stripped thermoplastic plies can be wound as film on rolls and used as such or can be reprocessed. When a two-ply tubular system is employed with a thermoplastic layer on the outside and with a saran layer inside, the outer layer may be slit and stripped from the inner tubular layer. In such a case, precautions must be taken to prevent the innermost saran faces from bonding one to another when the tubing is collapsed, since freshly extruded saran is generally very sticky. Dusting or coating the innermost surface with anti-blocking compound is one accepted method of overcoming this problem.

The saran layer above can be employed as tubing or can be slit longitudinally and employed as film. In the latter case the saran layer can be cut at the same time or later than the thermoplastic layer. Obviously, if the two-ply tubular system employs a saran layer outside with a thermoplastic layer inside the saran layer can be cut prior to cutting the thermoplastic ply although normally this is not as convenient.

The term "stripping" is intended to include any means employed for separating the saran ply from the thermoplastic plies.

When a flattened laminated tubular product is produced, it is possible to separate the plies by employing knives or cutting edges to cut all of the plies along the edges of the flattened multi-ply tubing, thence separating the plies and winding upon individual rolls. The flattened multi-ply tubing may be wound up on a supply roll, and the flattened edges of the wound multiply tubular material cut therefrom, and the roll of multi-ply material unwound with the individual plies being separated and wound upon individual rolls. Soluble inner and/or outer plies can be removed by passing the multiply tube through an appropriate solvent, e.g., and outer and inner ply of polyvinyl alcohol can be removed from the saran center ply by passing the tube through hot water.

The unoriented saran film prepared according to the invention generally has a shrink of 1 percent to 5 percent in the transverse direction and a shrink of 2 percent to 10 percent in the longitudinal direction, is devoid of pinholes and die scratches, has a haze of not over 7 percent and a tensile strength of 2500 pounds per square inch to 4500 pounds per square inch and an elongation of 200 percent to 300 percent and a tear strength of at least 50 grams per mil at a temperature of 23° C.

When colorant or other additives is added to the saran ply, the clarity, of course, will be affected, but the other properties are substantially unaffected.

The invention will be best understood in connection with the drawings wherein.

It is important that all portions of the die through which the molten saran travels be of streamlined construction There should be no sharp corners or projections around which the material must flow, but instead the pertinent portions of the die should have smooth contours. The portions of the die in contact with the saran should be constructed of a material such as nickel which does not catalyze the decomposition of the saran. The portions of the die which contact only polyethylene or polypropylene or the like need not be streamlined or constructed of special material. Of course, if desired, these portions of the die can be streamlined and all of the die may be made of nickel.

As is well known, the extrusion of saran poses problems due to the thermal instability of this class of materials. The rate of decomposition of saran is a function of both time and temperature; at increasingly higher temperatures, the permissible time of exposure becomes rapidly less. In normal practice, extrusion temperatures for use with the most stable blends of vinylidene chloride homopolymers and/or copolymers are limited to a maximum of approximately 180° C.

Figure 1:
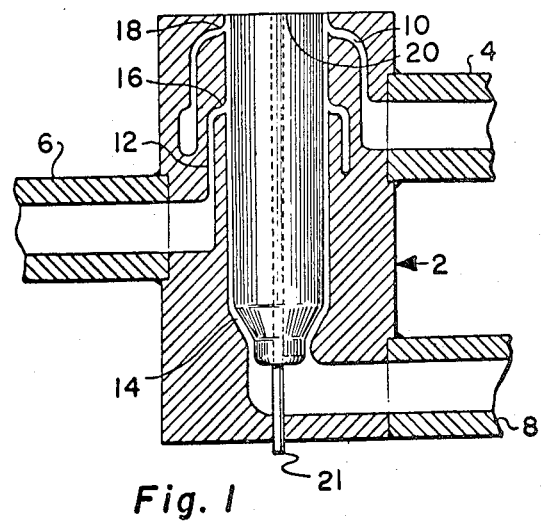
FIG. 1 is a sectional view of one form of die suitable for use in the invention.

In a relatively simple die of the essentially solid construction symbolized by FIG. 1, the maximum usable die temperature would be limited to 180° C. when saran was to be used in one of the plies. The temperature limitation dictates the types of thermoplastic homopolymers and copolymers which could be utilized in this form of the invention, such thermoplastic materials being limited to the class which can be extruded at die temperatures of 180° C. or lower. Typical materials in this category include, but are not limited to, polyethylene and polystyrene homopolymers and copolymers.

Shortening the time of exposure of saran to elevated temperatures makes possible the use of higher temperatures. This may be achieved by the use of suitable die configurations which will isolate the saran sections of the die from the non-saran sections up to the point where the multiple polymer streams come together. The combined stream would be cooled as rapidly as possible after emerging from the die to prevent saran decomposition.

An alternate method for combining saran with high melting resins utilizes a die wherein the several parts of the die conveying the different polymer streams are isolated one from another by the incorporation of hollow cavities, to be filled with circulating liquids at the temperature required to protect the saran from overheating. Alternatively, the cavities can be connected to suitable condensing mechanisms, and filled with liquids whose boiling points are low enough to prevent saran decomposition. Excess heat applied to the outside of the die would create the desired temperatures adjacent to the cavities as the filling liquid boils. These would keep the isolated portions of the die below the temperatures at which the saran would decompose. Other devices for achieving the same purpose will readily occur to those skilled in the art.

With such precautions saran can be laminarly combined with materials which melt at temperatures as high as 200° C. or higher. High melting materials suitable for such combining include, but are not limited to, polypropylene, polyacetals, polyesters, nylon.

While any conventional extrusion temperatures can be employed, e.g., 130° C. to 160° C. for the saran and 145° C. to 250° C. for the polyethylene, usually the temperatures of extrusion for the several plies will be approximately the same.

In the illustrative examples in connection with the drawings utilizing saran and polyethylene, the extrusion temperature for all of the plies was within 135° C. to 150° C. The saran was compounded from 92 percent Saran 925 (75 percent vinylidene chloride — 25 percent vinyl chloride copolymer as manufactured by Dow Chemical Company, Midland, Mich.), 7 percent dibutyl sebacate and 1 percent tetrasodium pyrophosphate, and the polyethylene was Alathon 14 (molecular weight about 20,000 and density 0.916, melt index 2 and manufactured by E. I. duPont de Nemours).

Other polyethylenes of high, medium or low density and prepared by either high or low pressure processes can be employed. The polyethylene can vary widely in molecular weights, e.g., from 7,000 to 35,000 or higher.

Referring more specifically to FIG. 1 of the drawings, there is provided a die 2 having extruders (none shown) connected thereto respectively by adapters 4, 6, and 8. Molten polyethylene is transmitted from one extruder through adapter 4 to stream 10 and molten saran is transmitted from a second extruder through adapter 6 to stream 12. Molten polyethylene is transmitted from a third extruder through adapter 8 to stream 14. The adapters and the die sections are heated sufficiently in order to maintain the polymers in a molten state by employing conventional heating means, i.e., electric heaters, hot oil or steam. Stream 12 joins stream 14 at juncture 16. Subsequently, stream 10 joins the combined streams 12 and 14 at juncture 18. It will be observed that the saran is sandwiched between the two plies of polyethylene. After all three plies have been united, they leave the die at face 20. Air or gaseous medium is introduced through pipe 21 to inflate the multiwall tube as it leaves the die face 20.

Figure 2:
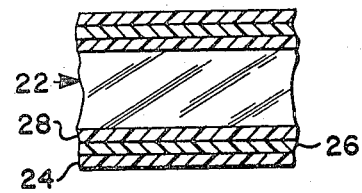
FIG. 2 is a sectional view of a tubular laminate product of the tape produced by the invention.

Referring to FIG. 2, the product leaving the die as a continuous tube is composed of an outer polyethylene layer 24, a center saran layer 26, and an inner polyethylene layer 28. The outer layer can also be made of polypropylene (e.g., Hoechst polypropylene, density 0.90) or other thermoplastic polymer or both the inner and outer layers can be made of polypropylene or other thermoplastic polymer by appropriate change of material fed to adapters 4 and 8.

Figure 3:
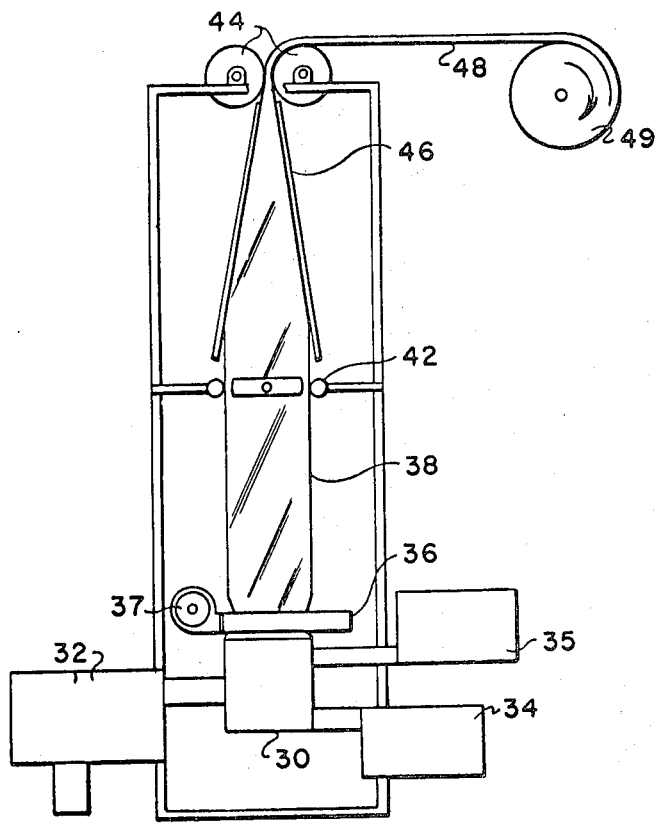
FIG. 3 is a schematic illustration of the invention.

While the multi-ply material need not be expanded as it comes from the die, it is preferably expanded as shown in FIG. 3. Generally, it is expanded 2 to 2.5 times as it leaves the die. Thus, very thin saran film, e.g., 0.1 to 0.5 mil, having a coating of 0.1 to 2.0 mil polyethylene or other thermoplastic polymer on each side can be readily prepared.

Referring to FIG. 3, there is provided a die 30. Saran is supplied to the die from extruder 32 and polyethylene is supplied to the die from extruder 34 and 35 in order to make a three-ply (polyethylene-saran-polyethylene) laminate. Extruder 34 and 35 may be replaced by a single extruder feeding two adapters in order to supply polyethylene for both the innermost and outermost plies.

The tubular saran ply and the tubular polyethylene plies are joined within the die in the manner shown in FIG. 1 with a polyethylene ply being on the outside, the saran ply being in the middle and the other polyethylene ply being the inner layer. As is conventional in the polyethylene extrusion art, a cooling ring 36 with air circulating therefrom is provided near the exit of the die with air provided by blower 37. Tube 38 having an outer ply of polyethylene and a middle ply of saran and an inner ply of polyethylene as it leaves the die face in an upward direction is formed into a bubble with the aid of air or other entrapped gas maintained between the die face and deflate rolls 44. The position of the bubble is regulated by guiding devices 42. The blown tubing generally has a shrink of 1 to 10 percent in a transverse direction and 1 percent to 20 percent in a longitudinal direction at 85° C. (This is true for both two- and three-ply tubular products.) In a specific example with the three-ply polyethylene-saran-polyethylene, the shrink was 2 percent transversely and 12 percent longitudinally. The laminated bubble 38 is flattened at the upper end with the aid of flattened plates 46. The flattened three-ply tubing is wound on a windup roll 49.

After storing the supply rolls for a sufficient time to allow for crystallization of the saran, the individual plies may be separated and wound on individual supply rolls as film. If the individual saran ply is wound on a roll before crystallization, the adjacent plies will adhere to each other and destroy the film upon attempted subsequent separation for use.

Figure 4:
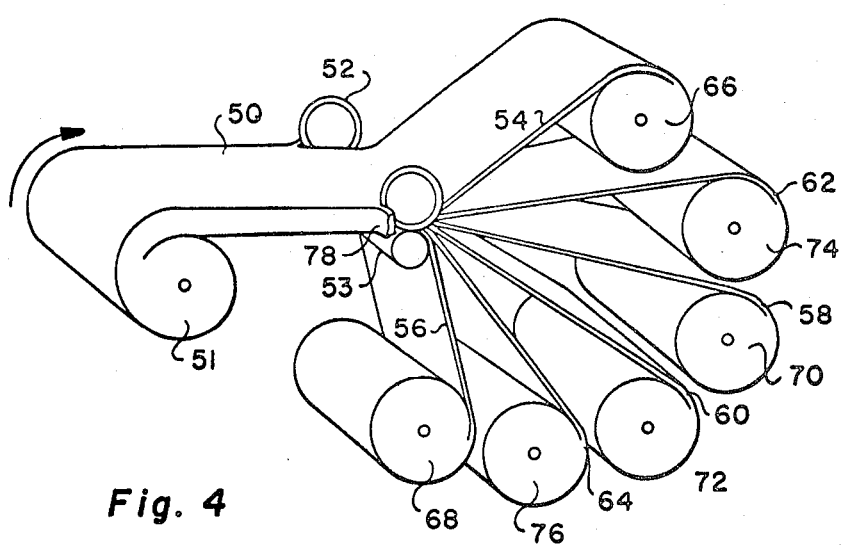
FIG. 4 is a schematic illustration of the process for separating tubular laminate into individual film plies.

In FIG. 4 is shown a schematic representation of a method for separating the individual plies of a multi-ply tubular product which is wound on a supply roll such as 49 in FIG. 3.

In FIG. 4 the flattened three-ply tubing in the form of a tape 50 from supply roll 51 passes under circular knives 52 which work in conjunction with press roll 53 and positioned near the edges of the flattened multi-ply tube so that each of the folded edges of the flattened three-ply tube 50 are cut. The outer polyethylene plies 54, 56 and the inner polyethylene plies 58, 60 of the tape are continuously stripped from the middle saran plies 62 and 64. The polyethylene plies 54, 56, 58, 60 pass to wind-up rolls 66, 68, 70, 72, respectively, and the saran plies 62 and 64 pass to windup rolls 74 and 76. The trimmed off portion 78 is removed as scrap in any conventional manner, i.e., air suction duct.

If sufficient time has not elapsed for crystallization of the saran ply, slip sheets of nonadhering material, i.e., paper, must be used in order for the saran plies not to adhere to the adjacent surfaces on the windup rolls 74 and 76. Obviously, if the process of FIG. 3 and FIG. 4 are to be performed concurrently, a system of slip sheeting the saran supply rolls 74 and 76 must be used. An alternate method which may be employed is an inventory system between deflate rolls 44 and the windup rolls 74 and 76 in order to allow the saran film time for crystallization, which time was approximately thirty minutes at room temperature.

In a specific example utilizing the process shown in FIG. 3, the circular die orifice had an outside diameter of 25.4 centimeters, an inside diameter of 25.2 centimeters. Extruder 35 was eliminated and extruder 34 supplied the polyethylene for both of the outer plies of the laminate. Saran, compounded as indicated above, was extruded at a rate of 40 pounds per hour in extruder 32 and polyethylene (Alathon 14 from E. I. duPont de Nemours) was extruded at 70 pounds per hour in extruder 34. The maximum diameter of the bubble was 63 centimeters. The distance from the die orifice to the deflate rolls was 213 centimeters and the deflate rolls rotated at a surface speed of 12.2 meters per minute. The windup roll 49 rotated at the same surface speed as the deflate rolls. After crystallization of the saran, the individual film plies were separated and the finished single layer saran film had a thickness of 0.2 mils, and the polyethylene film layer had a thickness of 0.2 mils and 0.2 mils, respectively.

The saran layer of the film laminate thus formed had a transverse shrink of 2 percent and longitudinal shrink of 7 percent. To those familiar with the art, this film is substantially unoriented and represents normal shrinkage for hot blown film. The subject invention thus represents a novel method of producing a very thin, unoriented, saran film. This is made possible by having the saran between two layers of hot thermoplastic so it does not cool rapidly and become oriented. When "hot blowing" plain saran by other known methods, the rapid cooling and nature of the material results in an appreciable amount of orientation and therefore subsequent ability to shrink.

Physical properties of the saran film produced by the example above and the laminate containing the saran film ply produced by the example above were as follows:

|  | Saran Film Ply |  | Three-Ply Laminate |
|---|---|---|---|
| Modulus 22°C. (lbs per sq in) |  | 43,800 |  | 26,000 |
| Tensile Strength (lbs per sq in) | T* | 2,800 | T | 2,400 |
|  | L** | 3,700 | L | 2,900 |
| Elongation (%) | T | 290 | T | 390 |
|  | L | 220 | L | 300 |
| Yield Point (lbs per sq in) | T | 2,500 | T | ( An Average |
|  | L | 3,500 | L | ( of About 1,400 |
| Shrink at 96°C. (%) | T | 2 | T | 2 |
|  | L | 7 | L | 12 |
| Haze (%) |  | 5.9 |  | — |
| Reflectance (%) |  | 1.4 |  | — |
| Tear Strength (g per mil at 23°C.) |  | 50 |  | — |

*T = Transverse
**L = Longitudinal

Figure 5:
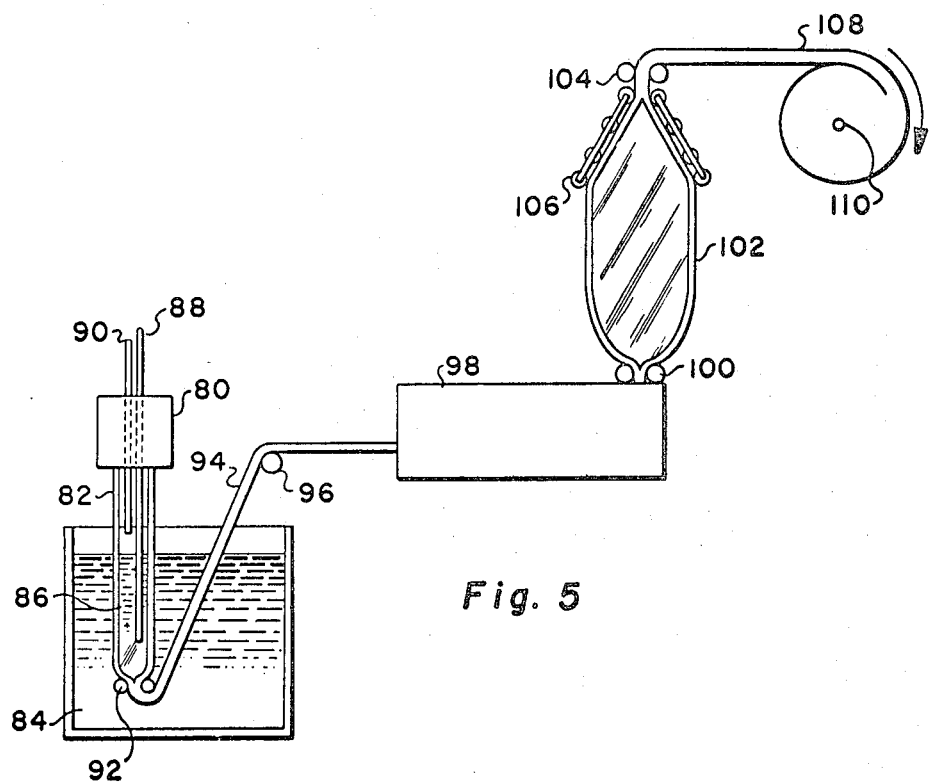
FIG. 5 is a schematic illustration of an alternative form of the invention (omitting the stripping step)

FIG. 5 illustrates an alternative stretching procedure employing a two-ply polyethylene-saran tube, with the saran being the inner ply. Polyethylene and saran are fed into die 80 and the two streams are joined within the die in a manner similar to that shown in FIG. 1, with the saran being on the inside. Instead of being expanded into a bubble, the two-ply tubing emerges from the die as an unexpanded tube 82. The tube passes through cooling bath 84, e.g., water maintained at room temperature.

As the tube passes through the cooling bath, a liquid 86 inert to saran, e.g., mineral oil, is recirculated through ducts 88 and 90 in the die head into the newly formed tube to prevent the walls of the tube from sticking together when the tube is pressed flat. The extruded tub had a wall thickness of 0.25 millimeters and a diameter of 19.0 centimeters. The extruded tube was pressed flat to form a tape 94 by passing through a pair of driven rolls 92 rotating at a surface speed of 3.35 meters per minute. The tape was fed over idle roll 96 into hot oven 98 maintained at 100° C. and fed through a pair of pinch rolls 100 at outlet end of oven 98, rotating at a surface speed of 3.38 meters per minute. Air or other gas is introduced into the heated tape to form a gas bubble 102 between the pinch rolls 100 and a pair of upper deflate rolls 104 in the air and rotating at a surface speed of 10 meters per minute. The bubble is gradually flattened with the aid of converging rollers 106. Following the collapse of the bubble by deflate rolls 104, the flattened tubing or tape 108 is fed to the roll 110 on which it is wound.

The bilaterally oriented product had a thickness of 0.2 mils in the polyethylene ply and 0.5 mils in the saran ply.

When it is desired to form film from wound flattened tubular tape such as that wound on roll 110 in FIG. 5, this can be done by simultaneous or progressive cutting. The wound-up supply roll of multi-ply material may be placed upon an apparatus similar to FIG. 4 and the multi-ply layers separated and wound upon individual supply rolls.

Figure 6:
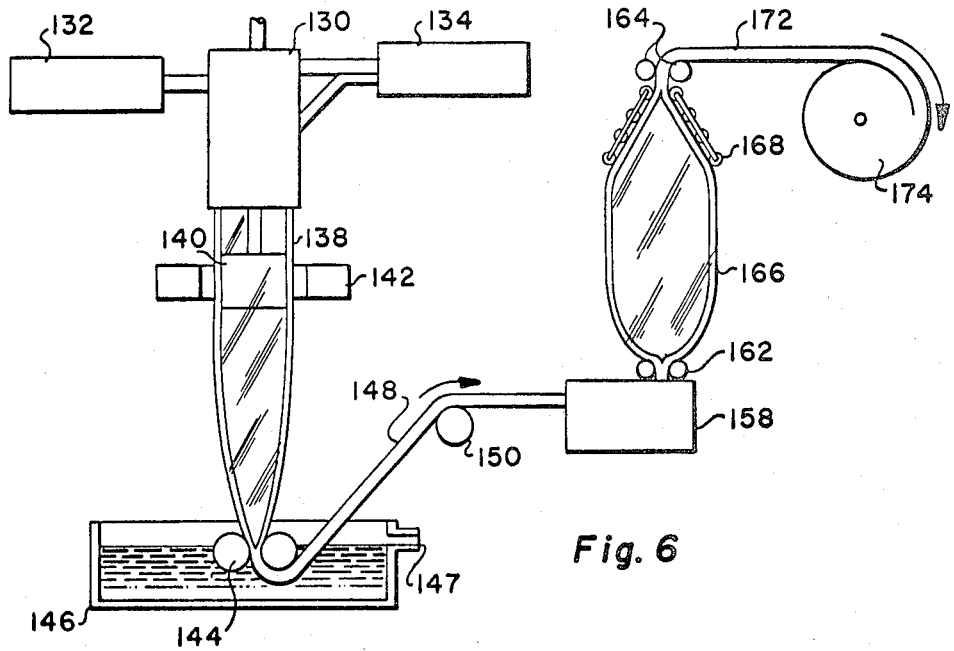
FIG. 6 is a schematic illustration of an alternative form of the invention (omitting the stripping step)

Another illustrative example of the instant invention is shown in FIG. 6. Saran is supplied to the die from extruder 132 and polyethylene is supplied to said die from extruder 134 through a two-stream adapter. The saran ply and the two polyethylene plies are joined within the die as shown in FIG. 1 with one polyethylene ply being on the outside, the saran ply being in the center, and the other polyethylene ply on the inside. The die is heated in conventional fashion by means not shown. Tube 138, having an outer ply of polyethylene, an intermediate ply of saran and an inner ply of polyethylene as it leaves the die face in a downward direction is drawn over a cylindrical cooling and forming mandrel 140. A water-cooling ring 142 with water circulating therefrom is provided opposite to the shoe and around it, and water impinges on the exterior surface of the tube 138 and cascades downward into tank 146. Overflow 147 maintains the level of the water in tank 146. The tube 132, having an outer ply of polyethylene, a middle ply of saran and an inner ply of polyethylene, is drawn down by the drive rolls 144.

In a specific example, the circular die orifice had an outside diameter of 25.4 centimeters, and a inside diameter of 25.2 centimeters.

Polyethylene was extruded at a rate of 85 pounds per hour from extruder 134, while saran was extruded at 40 pounds per hour from extruder 132.

A tube was extruded downward over a sizing mandrel through pinch rolls 144 rotating at a surface speed of 3.05 meters per minute. The diameter of the cooling mandrel was 19 centimeters, and the length was 10.1 centimeters, and the upper end of said mandrel was located 15.2 centimeters from the die face. Cooling water was supplied to the cooling mandrel with an inlet temperature of 10° C. and outlet temperature of about 12° C.

The substantially unoriented three-ply tape 148 emerging from the pinch rolls 144 had an overall thickness of 10 mils and was fed via idler roll 150 to hot oven 158 with ambient temperature of 100° C. The tape was fed from a pair of pinch rolls 162 rotated at a surface speed of 3.1 meters per minute and located at the outlet to the oven, to a pair of deflate rolls 164 in the air, and rotated at a surface speed of 11 meters per minute. Air was introduced into the tape to form a three-ply gas bubble 166 between the pinch rolls of oven and the upper deflate rolls 164. The film was cooled by the external air. The bubble was gradually flattened with the aid of converging rolls 168. The maximum diameter of the bubble was 68.5 centimeters The transverse stretch was 5 to 1 and the longitudinal stretch was 3 to 1. The finished tubing had a total wall thickness of about 0.7 mil. The thickness of the individual portions of the finished tubing were:

| | |
|---|---|
| Outer polyethylene | 0.40 mil |
| Saran | 0.20 mil |
| Inner polyethylene | 0.16 mil |

Following the collapse of the bubble by the deflate rolls, the flattened tubing or tape 72 is fed to windup roll 74. The flattened or folded edges of the tubing wound upon the roll may be cut simultaneously or consecutively and the plies of the film separated and wound up on separate rolls as pointed out above.

Physical properties of the three-ply laminates produced in the above example are as follows:

|  |  | Three-Ply Laminate (polyethylene-saran-polyethylene) |
| --- | --- | --- |
| Tensile Strength (lbs per sq in) | T | 7,600 |
|  | L | 6,300 |
| Shrink at 96°C. (%) | T | 61 |
|  | L | 54 |

It has been found that by combining the plies, e.g., polyethylene-saran-polyethylene, before extrusion from the die, there is obtained a better bond between the several layers than would be obtained by a laminate made from self-supporting film layers combined after forming each layer. This is important in subsequent processing prior to stripping, e.g., in the blowing or biaxial orientation step. The bond between the plies in the hot blown bubble makes it possible to produce very thin saran plies with uniform gauge and uniform characteristics.

Tests were made upon the finished laminate produced by the instant invention to measure the degree of adhesion or cling shear strength between the saran ply and the polyethylene ply as compared to the adhesion between a saran ply and a polyethylene ply placed in intimate contact by using pressure rolls, but no adhesive. The specimens were prepared by starting the separation of the plies and measuring the amount of pull necessary to separate in-shear a unit cross-section of the specimen laminate. The individual ply of the specimen properly prepared was placed in the jaws of an Instron Tensile Tester with the jaws having an initial separation of 5.08 centimeters and the laminate between the jaws. The load was observed at the point of shear separating the plies. On test samples of a saran and polyethylene laminate produced according to the illustrative example shown in FIG. 2, an average value of 390 grams per square centimeter was obtained. Similar tests upon a laminate produced by placing a saran ply of identical gauge and identical polymer composition in contact with a ply of polyethylene of identical gauge and polymer composition with 500 pounds per square inch pressure at 22°C. for 5 minutes produced an average value of 90 grams per square centimeter. When this latter test was repeated using the same pressure but a temperature of 65°C. and times up to 1 minute, the average value of 170 grams per square centimeter was obtained.

Irradiation may be used to advantage in the instant invention to make it possible to use a minimum thickness of polyolefin material in the multi-ply tube and obtain a laminate and/or a saran ply with greater clarity and surface gloss than heretofore obtainable by known processes.

Figure 7:
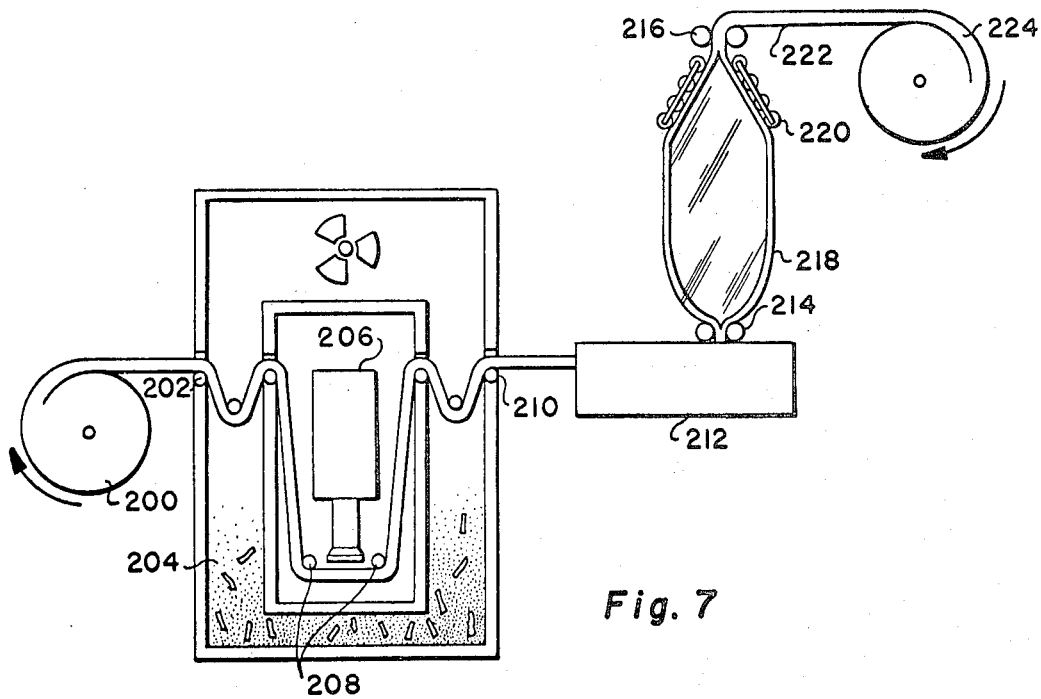
FIG. 7 is a schematic illustration of an alternative subsequent treatment.

The substantially unoriented three-ply tubular tape such as 148 emerging from deflate rolls 144 of FIG. 6 can then be irradiated and bi-axially oriented as shown in FIG. 7, For simplicity in FIG. 7, roll 200 represents a supply of substantially unoriented three-ply tubular tape. The tape being fed from the supply roll 200 could be replaced by tubular tape 148 of FIG. 6 and a continuous process employed. Due to crystallization time of the saran layer as mentioned above, the irradiation must take place within about 30 minutes after extrusion. In a specific example employing the method shown in FIG. 7, the tape from the supply roll 200 was of three tubular plies and was fed through feed rolls 202 into a vault 204 which houses and encloses an electron beam generator 206 (e.g., a 2 million volt General Electric resonant transformer). With the aid of feed rolls 208, the tape was caused to pass through the electron beam of the generator. The total irradiation dosage can be varied and was 12 megarad in the specific example. Following irradiation, the tape was fed by feed rolls 210 rotated at a surface speed of 3.35 meters per minute to an oven 212 at 200°C. The tape was fed from a pair of pinch rolls 214 rotated at a surface speed of 3.39 meters per minute at the outlet of the oven 212, to a pair of deflate rolls 216 in the air and rotated at a surface speed of 10.1 meters per minute. Air or other gas is introduced into the heated tape to form a three-ply gas bubble 218 between the pinch rolls 214 and the upper deflate rolls 216. The bubble is cooled by the outside air and was gradually flattened with the aid of converging rolls 220. The transverse stretch was 4 to 1 and the longitudinal stretch was 3 to 1. The finished tubing had a wall thickness of about 0.018 millimeters. Following the collapse of the bubble by deflate rolls 216, the flattened tubing 222 was fed to roll 224 on which it is wound.

The physical properties of the irradiated oriented saran film ply above and the three-ply laminate made in the above examples were as follows:

|  | Saran Film Ply |  | Three-Ply Laminate |  |
| --- | --- | --- | --- | --- |
| Gauge (mils) |  | 0.3 | (Polyethylene (Saran (Polyethylene | 0.4 0.3 0.3 |
| Modulus at 22°C. (lbs per sq in) |  | 23,900 |  | 22,300 |
| Shrink at 96°C. (%) | T L | 45 42 | T L | 54 46 |
| Haze (%) |  | 1.1 |  | 7.3 |
| Reflectance (%) |  | 0.8 |  | 1.3 |

The conditions of irradiation and stretching can be varied in accordance with the teachings of Colombia Pat. No. 8,767 and Baird application, U.S. Ser. No. 713,848, filed Feb. 7, 1958 now U.S. Pat. No. 3,022,543.

When irradiation is employed, it can be accomplished by the use of high energy irradiation using electrons, X-rays, gamma rays, beta rays, etc. Preferably, electrons are employed of at least $10^4$ electron volt energy. The irradiation source can be a Van de Graaff type electron accelerator, e.g., one operated at 2,000,000 volts with a power output of 500 watts. Alternatively, there can be employed other sources of high energy electrons, such as the General Electric 2,000,000 volt resonant transformer or the corresponding 1,000,000 volt, 4 kilowatt, resonant transformer. The voltage can be 10,000 or 2,000,000 or 3,000,000 or 6,000,000 volts or higher. The irradiation is usually carried out between 1 megarad and 75 megarad, with a preferred range of 8 megarad to 20 megarad. Irradiation can be carried out conveniently at room temperature, although higher and lower temperatures, e.g., 0°C. to 60°C. can be employed.

The biaxially unoriented multi-ply tubing formed (either irradiated or unirradiated) can undergo a transverse stretch of 100 percent to 900 percent, preferably 300 percent to 500 percent, and a longitudinal stretch of 100 percent to 700 percent, preferably 300 percent to 500 percent. It is extremely difficult to continuously biaxially orient unirradiated polyethylene by such a bubble stretching technique since the bubble normally breaks in a short period of time. However, by employing a two-ply polyethylene-saran tube or a three-ply polyethylene-saran-polyethylene tube, it is possible to extend the period of continuous stretching considerably.

Some of the laminate products produced as an intermediate step in the preferred process have improved characteristics which have been heretofore unknown, particularly those laminates made up of polyolefin and saran. Polyolefin films have been widely used in packaging applications. However, the lack of vapor barrier characteristics has prevented the application of these films to packages where low oxygen and moisture vapor transmission are required or desired, as in the packaging of foods. Unoriented polyethylene-saran, polyethylene-saran-polyethylene, polypropylene-saran, or polypropylene-saran-polypropylene laminates as produced by the process described in conjunction with FIG. 2 were particularly interesting. Economically, this product is of great importance because of the relatively thin laminates which it is possible to obtain. In addition, the degree of intimate contact between the plies obtainable by the extrusion and combining of the molten plies within the die results in a film laminate which can be used for many packaging applications without further treatment. It is well-known that such laminates of polyethylene and saran heretofore made by combining self-supporting sheets of each of these materials or coating self-supporting polyethylene film with a coating of saran from solution has required modification of the polyethylene surface to effect surface adhesion of the plies. In the laminated product by the instant invention, the adherence of the plies is sufficient to maintain them in intimate contact during use. However, once the edges of the self-supporting individual plies are separated, they may be stripped from the adjacent plies of the laminate without difficulty.

Similarly, the biaxially oriented laminated product as produced by the process described in connection with FIGS. 4, 5, and 6 has unusual properties which will make them useful for packaging applications.

It is also possible to have more than three plies, e.g., there can be formed a five-ply polyethylene-saran-polypropylene-saran-polyethylene tubing.

While preferably the plies are formed as tubing, it is possible to form the multi-ply product directly as sheeting by employing a slit die. In such case the saran ply can be stripped from the other ply or plies by cutting or any of the other methods proposed above.

The polyethylene or other thermoplastic polymer, particularly in the three-ply construction, prevents the saran from sticking to itself when wound into a roll prior to stripping. The need for inventory equipment to allow for time of crystallization to render the saran non-tacky is thus eliminated.

As previously mentioned, very thin films can be formed. Thus, a three-ply polyethylene-saran-polyethylene having a total thickness of 30 mils (10 mils per layer) can be hot blown as it comes out of the die to an overall thickness of 1.5 mil (0.5 mil per layer) or less. The several plies need not be of the same thickness. The saran ply can be either greater or smaller in thickness than the polyethylene or polypropylene ply or plies. For examples, the saran ply can be 10 percent to 90 percent of the thickness of the thermoplastic polymer ply in a two-ply product.

It is possible to incorporate dyes and pigments into one or more of the layers to obtain novel color effects. Thus, a dye, e.g., F.D. plus C Red 32, could be incorporated in the center saran layer while omitting it from the external olefin polymer layers. This technique can be used to special advantage to lock in a pigment or dye which would otherwise bleed.

The products of the present invention can be used as conventional pouches, boil-in-bag pouches (particularly if irradiated), turkey bags, shrinkable pouches (particularly if the multi-ply product is racked), grease resistant pouches, rust and mold inhibiting films, pouches and bags, red meat protective film, pouches and bags, moisture control films, vacuum forming raw material, window films, improved weathering films, improved abuse resistant films at a wide range of temperatures, drum and other container liners, bread wraps, wrapping for cheese (particularly a sandwich of polyethylene-saran-polyethylene to give low permeability), containers which are resistant to gas and liquid transmission for medicine, pharmaceuticals, cosmetics, perfumes and the like, pipe line wrapping, floor tiles, bottle cap liners, e.g., crown cap liners.

The term "film" as used herein is generic to both tubing and sheet stock unless a contrary meaning is clearly indicated.

We claim:

1. A substantially unoriented crystalline film made from a thermoplastic copolymer of vinylidene chloride and at least one copolymerizable monomer wherein the vinylidene chloride is at least 50 percent of the material in the copolymer, said film having a shrinkability at 96°C of 1 to 5 percent in the transverse direction and 2 to 10 percent in the longitudinal direction, a haze of not over 7 percent, and an elongation of at least 100 percent in both the transverse and longitudinal directions, said film having been made by coextruding said copolymer as a melt between outer plies of thermoplastic polymers through a die so as to produce a copolymer film between the outer plies which is substantially devoid of pinholes and scratches and has low oxygen permeability and thereafter separating said outer plies from said copolymer film.

2. The film of claim 1 wherein said film has been irradiated with high energy electrons to a dosage of 1 megarad to 75 megarads.

3. A biaxially oriented crystalline film made of a thermoplastic copolymer of vinylidene chloride and at least one copolymerizable monomer, wherein the vinylidene chloride is at least 50 percent of the material in the copolymer, said film having an average thickness of less than 0.3 mil and having a shrinkability at 96°C of 100 to 500 percent in the transverse direction and 100 to 700 percent in the longitudinal direction, said film having been made by coextruding said copolymer as a melt between outer plies of thermoplastic polymer melts through a die, cooling and stretching to orient so as to produce a copolymer film between the order plies which is substantially devoid of pinholes and scratches and has low oxygen permeability and thereafter separating said outer plies from said copolymer film.

4. The film of claim 3 wherein said film has been irradiated with high energy electrons to a dosage of 1 megarad to 75 megarads after cooling but before stretching.

5. The film of claim 3 wherein said film has a haze of less than 2 percent and an average shrink of more than 30 percent in both the transverse and longitudinal directions.

* * * * *